United States Patent
Sukhomlinov et al.

(10) Patent No.: US 10,685,097 B2
(45) Date of Patent: Jun. 16, 2020

(54) APPLICATION BASED CHECKPOINTING CONTROL FOR STORAGE DEVICE

(71) Applicant: Intel Corporation, Santa Clara, CA (US)

(72) Inventors: Vadim Sukhomlinov, Santa Clara, CA (US); Sanjeev N. Trika, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 203 days.

(21) Appl. No.: 15/858,768

(22) Filed: Dec. 29, 2017

(65) Prior Publication Data

US 2019/0042710 A1    Feb. 7, 2019

(51) Int. Cl.
*G06F 21/12* (2013.01)
*H04L 29/06* (2006.01)
*G06F 11/14* (2006.01)
*G06F 21/78* (2013.01)

(52) U.S. Cl.
CPC ........ *G06F 21/126* (2013.01); *G06F 11/1407* (2013.01); *G06F 11/1461* (2013.01); *G06F 21/78* (2013.01); *H04L 63/145* (2013.01); *H04L 63/1458* (2013.01)

(58) Field of Classification Search
CPC ............... G06F 21/126; G06F 11/1407; G06F 11/1461; G06F 21/78; H04L 63/145; H04L 63/1458
See application file for complete search history.

(56) References Cited

U.S. PATENT DOCUMENTS

| | | | |
|---|---|---|---|
| 9,286,109 B1 * | 3/2016 | Backensto | G06F 11/1438 |
| 9,671,971 B2 | 6/2017 | Trika et al. | |
| 2010/0103837 A1 * | 4/2010 | Jungck | H04L 29/12066 370/252 |
| 2013/0167235 A1 * | 6/2013 | Kapoor | G06F 21/56 726/24 |
| 2016/0283160 A1 * | 9/2016 | Trika | G06F 3/0638 |

OTHER PUBLICATIONS

U.S. Appl. No. 15/721,625, entitled "Automated Continuous Checkpointing", filed Sep. 29, 2017, 66 pages.
U.S. Appl. No. 15/394,958, entitled "Method and Apparatus for Range Based Checkpoints in a Storage Device", filed Dec. 30, 2016, 58 pages.

* cited by examiner

*Primary Examiner* — Mohammed Waliullah
(74) *Attorney, Agent, or Firm* — Jordan IP Law, LLC

(57) ABSTRACT

An embodiment of a semiconductor apparatus may include technology to receive an application-related checkpoint request corresponding to a file of a file system stored on a persistent storage media, and determine one or more checkpoint operations internal to the persistent storage media to perform the application-related checkpoint request. Other embodiments are disclosed and claimed.

16 Claims, 5 Drawing Sheets

APPLICATION BASED CHECKPOINTING CONTROL FOR STORAGE DEVICE

TECHNICAL FIELD

Embodiments generally relate to storage systems. More particularly, embodiments relate to application based checkpointing control for a storage device.

BACKGROUND

Data in a storage device may be backed up at different points-in-time to allow restoration of data to a saved point-in-time as part of a process sometimes referred to as checkpointing. Operating system checkpointing may involve the operating system storing prior versions of updated data to create restore points or checkpoints to allow the user to return the state of the data to that checkpoint. However, operating system checkpointing may be susceptible to malware attacks that can attack the operating system and application files to corrupt the checkpoint data to prevent the user from restoring data to a point before the malware was installed. Operating system based checkpointing may also be susceptible to other software interference and anti-virus programs may need to be disabled for checkpointing to work properly. System backups may include a backup of all or most of the data in a drive as of a checkpoint time to another partition on the storage device or another storage device. System backups may run on the host system and consume significant host resources, which may result in performance degradation at the host system.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Various embodiments described herein may include a memory component and/or an interface to a memory component. Such memory components may include volatile and/or nonvolatile memory. Nonvolatile memory may be a storage medium that does not require power to maintain the state of data stored by the medium. In one embodiment, the memory device may include a block addressable memory device, such as those based on NAND or NOR technologies. A memory device may also include future generation non-volatile devices, such as a three dimensional crosspoint memory device, or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thiristor based memory device, or a combination of any of the above, or other memory. The memory device may refer to the die itself and/or to a packaged memory product. In particular embodiments, a memory component with non-volatile memory may comply with one or more standards promulgated by the Joint Electron Device Engineering Council (JEDEC), such as JESD218, JESD219, JESD220-1, JESD223B, JESD223-1, or other suitable standard (the JEDEC standards cited herein are available at jedec.org).

Volatile memory may be a storage medium that requires power to maintain the state of data stored by the medium. Non-limiting examples of volatile memory may include various types of RAM, such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

Figure 1:
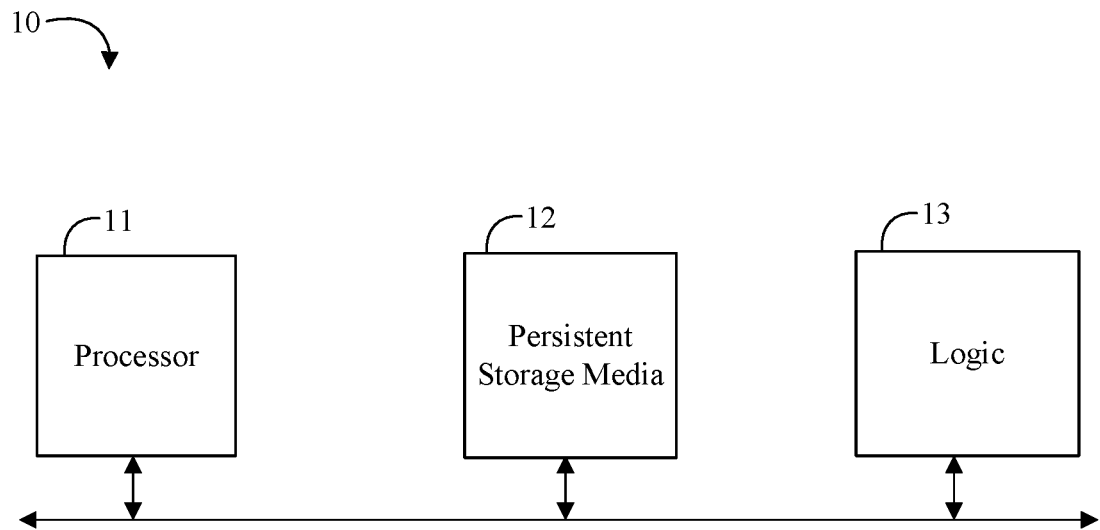
FIG. 1 is a block diagram of an example of an electronic processing system according to an embodiment.

Turning now to FIG. 1, an embodiment of an electronic processing system 10 may include a processor 11, persistent storage media 12 communicatively coupled to the processor 11, and logic 13 communicatively coupled to the processor 11 to receive an application-related checkpoint request corresponding to a file of a file system stored on the persistent storage media 12, and determine one or more checkpoint operations internal to the persistent storage media 12 to perform the application-related checkpoint request. For example, the logic 13 may be configured to receive the checkpoint request from a user interface application. In some embodiments, the logic 13 may be further configured to apply one or more policies to the checkpoint request. For example, the logic 13 may be configured to apply a policy to inhibit a denial-of-service attack from the checkpoint request, and/or to apply policies to automatically detect when to checkpoint, release a checkpoint, and/or restore on a per-file basis. For example, the persistent storage media 12 may include a solid state drive (SSD). In some embodiments, the logic 13 may be located in, or co-located with, various components, including the processor 11 (e.g., on a same die).

Embodiments of each of the above processor 11, persistent storage media 12, logic 13, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof.

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C # or the like and conventional procedural programming languages, such as the "C" programming language or similar programming languages. For example, the persistent storage media 12, or other system memory may store a set of instructions which when executed by the processor 11 cause the system 10 to implement one or more components, features, or aspects of the system 10 (e.g., the logic 13, receiving a checkpoint request from an application related to a file of a file system stored on the persistent storage media, determining one or more checkpoint operations internal to the persistent storage media to perform the file-related checkpoint request, etc.).

Figure 2:
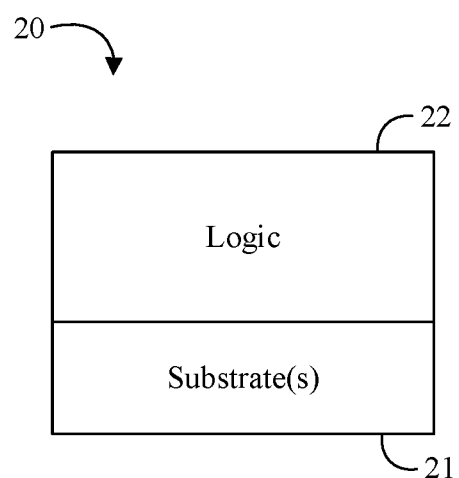
FIG. 2 is a block diagram of an example of a semiconductor apparatus according to an embodiment.

Turning now to FIG. 2, an embodiment of a semiconductor apparatus 20 may include one or more substrates 21, and logic 22 coupled to the one or more substrates 21, wherein the logic 22 is at least partly implemented in one or more of configurable logic and fixed-functionality hardware logic. The logic 22 coupled to the one or more substrates may be configured to receive an application-related checkpoint request corresponding to a file of a file system stored on a persistent storage media, and determine one or more checkpoint operations internal to the persistent storage media to perform the application-related checkpoint request. For example, the logic 22 may be configured to receive the checkpoint request from a user interface application. In some embodiments, the logic 22 may be further configured to apply one or more policies to the checkpoint request. For example, the logic 22 may be configured to apply a policy to inhibit a denial-of-service attack from the checkpoint request, and/or to apply policies to automatically detect when to checkpoint, release a checkpoint, and/or restore on a per-file basis. For example, the persistent storage media may include a SSD. In some embodiments, the logic 22 coupled to the one or more substrates 21 may include transistor channel regions that are positioned within the one or more substrates.

Embodiments of logic 22, and other components of the apparatus 20, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C # or the like and conventional procedural programming languages, such as the "C" programming language or similar programming languages.

The apparatus 20 may implement one or more aspects of the method 30 (FIGS. 3A to 3C), or any of the embodiments discussed herein. The illustrated apparatus 20 includes one or more substrates 21 (e.g., silicon, sapphire, gallium arsenide) and logic 22 (e.g., transistor array and other integrated circuit/IC components) coupled to the substrate(s) 21. The logic 22 may be implemented at least partly in configurable logic or fixed-functionality logic hardware. In one example, the logic 22 may include transistor channel regions that are positioned (e.g., embedded) within the substrate(s) 21. Thus, the interface between the logic 22 and the substrate(s) 21 may not be an abrupt junction. The logic 22 may also be considered to include an epitaxial layer that is grown on an initial wafer of the substrate(s) 21.

Figure 3A:
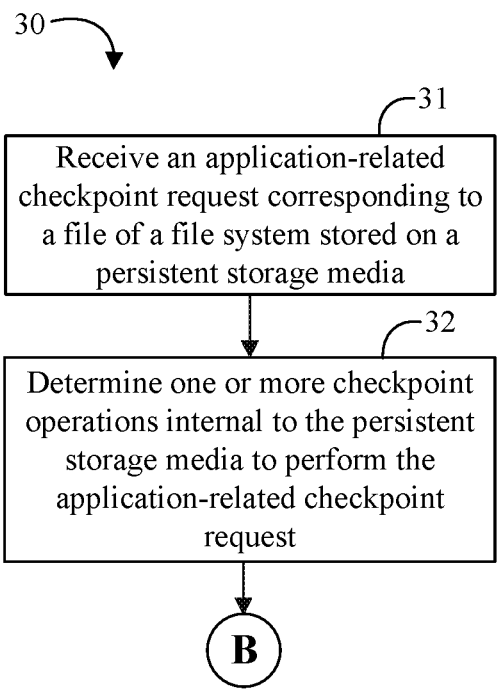
FIGS. 3A to 3B are flowcharts of an example of a method of checkpointing according to an embodiment.
Figure 3B:
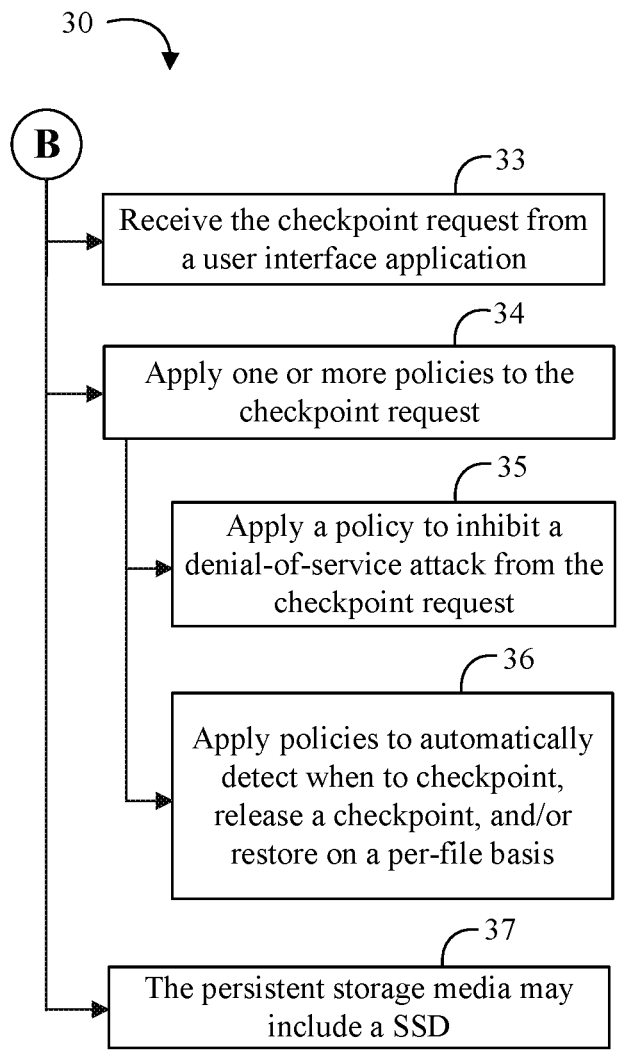

Turning now to FIG. 3A to 3B, an embodiment of a method 30 of checkpointing may include receiving an application-related checkpoint request corresponding to a file of a file system stored on a persistent storage media at block 31, and determining one or more checkpoint operations internal to the persistent storage media to perform the application-related checkpoint request at block 32. For example, the method 30 may include receiving the checkpoint request from a user interface application at block 33. Some embodiments of the method 30 may further include applying one or more policies to the checkpoint request at block 34. For example, the method 30 may include applying a policy to inhibit a denial-of-service attack from the checkpoint request at block 35, and/or applying policies to automatically detect when to checkpoint, release a checkpoint, and/or restore on a per-file basis at block 36. In some embodiments, the persistent storage media may include a SSD at block 37.

Embodiments of the method 30 may be implemented in a system, apparatus, computer, device, etc., for example, such as those described herein. More particularly, hardware implementations of the method 30 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 30 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C # or the like and conventional procedural programming languages, such as the "C" programming language or similar programming languages.

For example, the method 30 may be implemented on a computer readable medium as described in connection with Examples 19 to 24 below. Embodiments or portions of the method 30 may be implemented in firmware, applications (e.g., through an application programming interface (API)), or driver software running on an operating system (OS).

Figure 4:
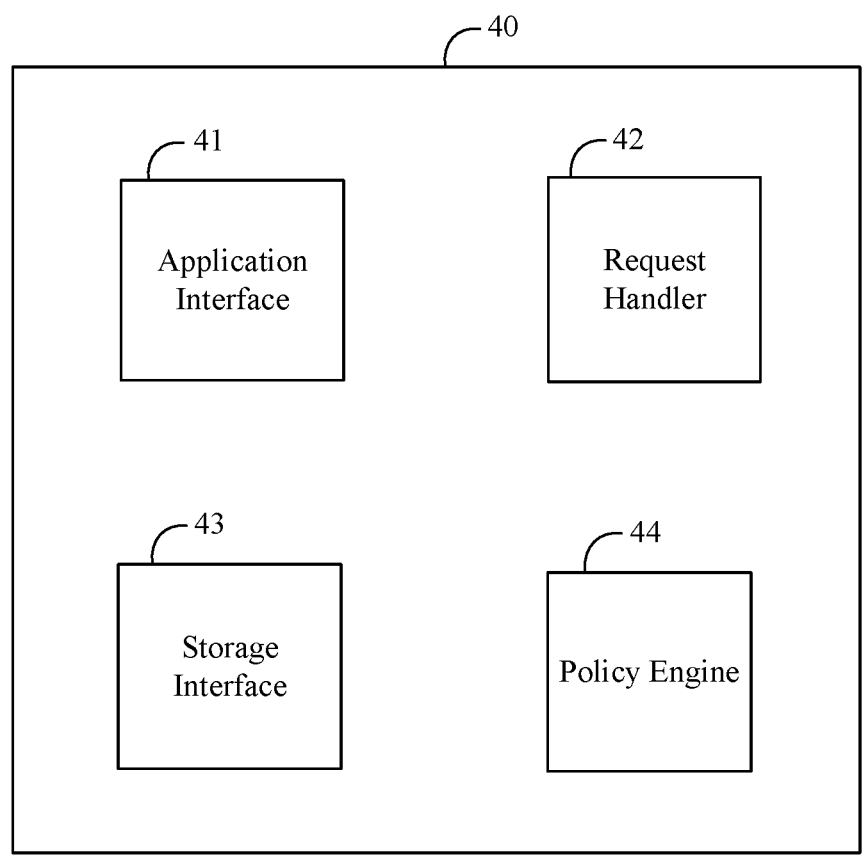
FIG. 4 is a block diagram of an example of a file checkpoint manager apparatus according to an embodiment.

Turning now to FIG. 4, an embodiment of a file checkpoint manager (FCM) 40 may include an application interface 41, a request handler 42, a storage interface 43, and a policy engine 44. The application interface 41 may include technology to receive an application-related checkpoint request corresponding to a file of a file system stored on a persistent storage media. For example, application interface 41 may be configured to receive the checkpoint request from a user interface application. The request handler 42 may include technology to determine one or more checkpoint operations internal to the persistent storage media to perform the application-related checkpoint request. For example, the request handler 42 may provide a set of internal checkpoint commands to the persistent storage media through the storage interface 43.

For example, the FCM 40 may receive checkpoint requests in any of several ways including an application active request and an application passive request. An application active request may include when an application makes a system/FCM call and thereafter notifies the FCM 40 on the validity of the file. An application passive may include when an agent external to an application (e.g., the agent may be part of the FCM 40) makes the checkpoint request. For example, the agent may have information related to the internal operations of the specific application and may infer specific requests for checkpointing from application behavior without modification of application to actively make the checkpoint requests. For example, a word processing application may have a specific handling of incorrect file data (e.g., displaying an error message dialog) which may be detected by an FCM agent and the FCM 40 may decide to restore modified content. In some embodiments, checkpointing requests may be related to file operations (e.g., open, close, read, write) and to the validity of file content (e.g., assuming the application can check if the file format is valid). Verification of validity of content may be important for automated recovery from ransomware encryption.

The policy engine 44 may include technology to apply one or more policies to the checkpoint request. For example, the policy engine 44 may be configured to apply a policy to inhibit a denial-of-service attack from the checkpoint request (e.g., by limiting the number of such requests from the application). The policy engine 44 may also provide and/or apply one or more policies to automatically detect when to checkpoint, release a checkpoint, and/or restore on a per-file basis.

Embodiments of the application interface 41, the request handler 42, the storage interface 43, the policy engine 44, and other components of the file checkpoint manager 40, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C # or the like and conventional procedural programming languages, such as the "C" programming language or similar programming languages.

Some embodiments may advantageously provide application-triggered checkpointing control for a SSD device. Some embodiments may be useful for checkpointing, file versioning, malware mitigation, validity checking, and/or version recovery, among other things. Data loss/recovery may be a long-standing problem for storage systems, with various well-known technology such as recycle bins, and undelete operations which may rely on legacy data stored in accessible sectors of a drives. Malware and ransomware may corrupt and/or encrypt important files and/or data which sometimes cannot be readily recovered. Some other storage devices may provide efficient storage-assisted checkpointing with technology to restore/recover content.

Some embodiments may advantageously leverage storage-assisted checkpointing technology to provide a checkpoint orchestrator/manager and configurable policies that may allow a trusted user (e.g., a system administrator) to control the checkpointing of a storage system on a per-application and per-directory/file level. For example, some embodiments may advantageously provide more than one checkpoint per file or logical block address (LBA) range. Some embodiments may have a lower storage cost per checkpoint. Some embodiments may provide application-control of checkpointing. For example, some embodiments may allow an application to request the SSD to effectively checkpoint its file(s), and later to use and/or discard the checkpoint(s). The application or the checkpoint manager may decide when to checkpoint and/or may determine how much to rollback. Some embodiments may provide more effective checkpointing, for example, by creating, using, restoring from, and/or releasing checkpoints for important events, which may be identified with application-specific information. Some embodiments may also provide administrative control to limit the capacity used for checkpointing by any application. Advantageously, some embodiments may be less susceptible to an attack where malware attempts to write a large amount of data to the storage system (e.g., repeatedly to a few sectors/files, exceeding the total checkpointing capability (capacity) of the storage system).

Some embodiments may utilize a storage device's internal checkpointing technology to provide improved file recovery technology, anti-malware technology, and/or anti-ransomware technology. In particular, some embodiments may provide good performance, low-cost, easy and effective technology to recover user-data in case of such ransomware or other malicious attack. While some embodiments may be discussed in an example context of a NAND-based SSD, embodiments of the technology may apply to other storage systems. For example, some embodiments may be particularly useful for a storage system that includes indirection/log-structured-writes/background-space-reclaim, such as software systems, serial peripheral interface (SPI) storage, log structured merge (LSM)-based key-value systems, three dimensional crosspoint memory based systems, etc.

For example, some storage devices may implement checkpointing internal to the storage device and control logic of the storage device controller to make the restore procedure less susceptible to malware (e.g., which may operate at the application and operating system level). Encryption technologies may also be used by the storage device control logic to authenticate checkpointing related communications from the host system to prevent malware from issuing storage device checkpointing commands to corrupt the checkpoint data in the storage device. Administrative access control may also be used to authenticate checkpointing related communication from the host system to the drive. For example, an SSD may support various internal checkpointing APIs/commands including a CheckpointLBAs command, an UncheckpointLBAs command, and a RestoreLBAs command. Some embodiments may advantageously provide technology that allows individual applications to trigger, use, and release checkpoints. For example, an application-initiated checkpointing operation may determine the appropriate commands to allow a secure checkpoint and rollback of selected LBA-ranges, where a file may be mapped to LBA-ranges with file-system hooks. Some embodiments may provide technology for user control of checkpointing of files/directories and applications. Some embodiments may additionally or alternatively provide technology for application control of checkpointing of the files the application uses. Advantageously, some embodiments may allow an administrator to inhibit or prevent a malware denial-of-service attack to the checkpoint capability. Some embodiments may also provide policies for automatically detecting when to checkpoint, restore, and/or release checkpoints on a per-file basis.

Figure 5:
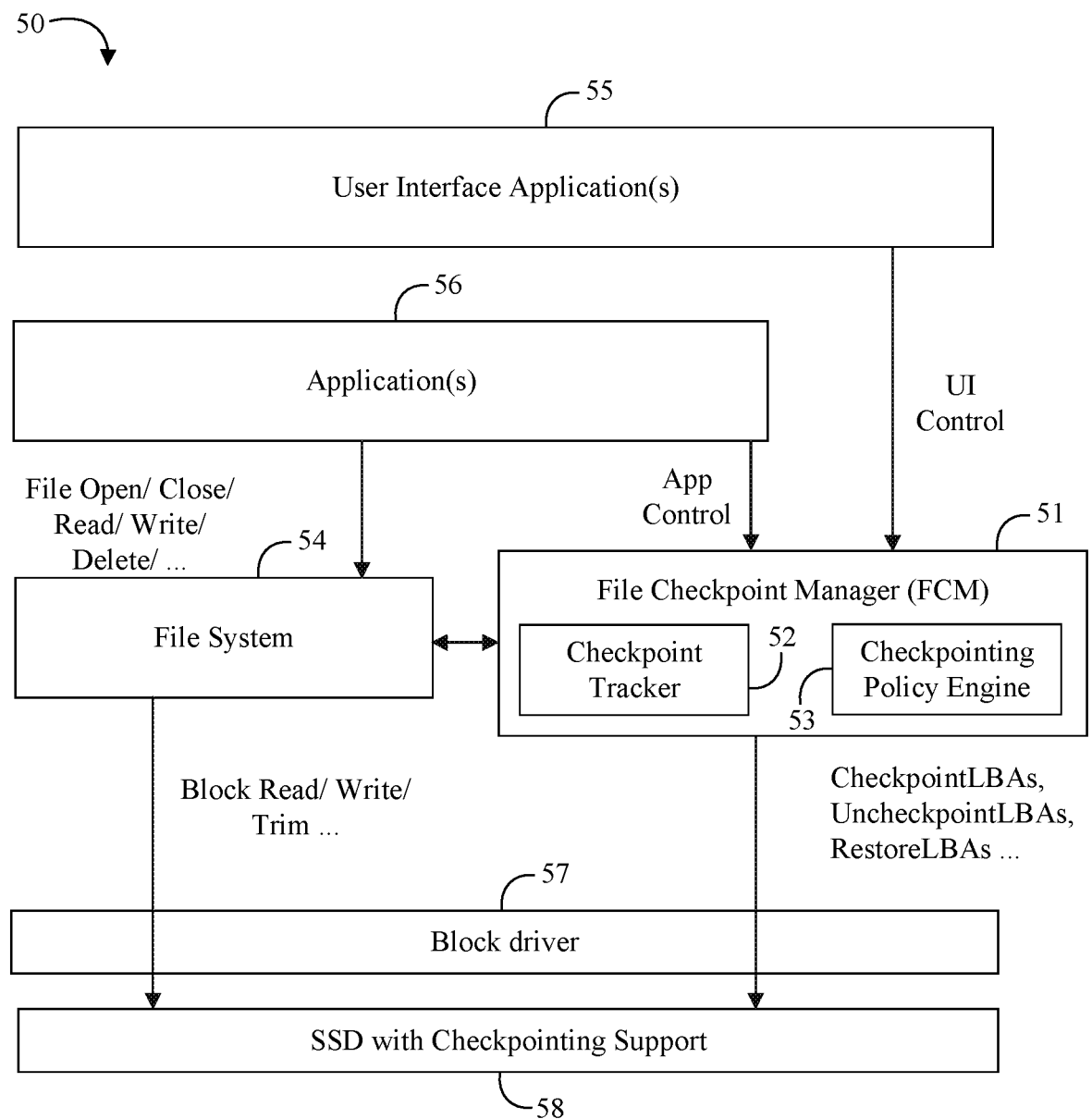
FIG. 5 is a block diagram of another example of an electronic processing system according to an embodiment.

Turning now to FIG. 5, an embodiment of an electronic processing system 50 may include a file checkpoint manager (FCM) 51 including a checkpoint tracker 52 and a checkpointing policy engine 53. As used herein with respect to checkpointing, the word "file" may encompass both files and directories in a file system. In some embodiments, a checkpointing-related operation on a directory may be equivalent to recursively executing that operation on all subdirectories and files in the specified directory. The FCM 51 may be communicatively coupled to a file system 54, one or more user interface applications (UIs) 55, and other applications 56. The FCM 51 and the file system 54 may be communicatively coupled through a block driver 57 to a SSD device 58 which includes internal checkpointing support. The block driver 57 may perform appropriate block operations for the SSD 58 (e.g., block read, write, trim, etc.). For example, security technology on the SSD 58 and/or host may authenticate the FCM 51 to the SSD 58 and establish secure communication between the FCM 51 and the SSD 58. The FCM 51 may be configured to manage checkpointing/restore of files and directories of the file system 54, based on application 56 and UI 55 control, and configurable automated policies. Suitable authentication and security may also be provided between the file system 54, the UIs 55, the applications 56, and the FCM 51.

For example, the FCM 51 may receive checkpoint requests from the applications 56 related to files of the file system 54 stored on the SSD 58. The FCM 51 may also receive checkpoint requests from the UIs 55. The FCM 51 may also get application-related requests by monitoring application behavior. The FCM 51 may determine one or more internal SSD checkpoint commands (e.g., CheckpointLBAs, UncheckpointLBAs, etc.) needed to perform the file-related checkpoint request. The checkpointing policy engine 53 may apply one or more policies to the checkpoint requests, including a policy to inhibit a denial-of-service attack from the checkpoint request (e.g., by limiting the number of such requests from the UIs 55 and/or the applications 56). The checkpointing policy engine 53 may store and apply the one or more policies, including policies to automatically detect when to checkpoint, release a checkpoint, and/or restore on a per-file basis.

Advantageously, the FCM 51 may provide the intelligence and corresponding controls for checkpointing operations on files. For example, embodiments of the FCM 51 may be embedded in a file-system, in security software, or as a stand-alone component (e.g., as shown in the system 50). In some embodiments, the FCM may provide a CheckpointFile API/command, an UncheckpointFile API/command, and a RestoreFile API/command which may complement the LBA-level operations. Using these file-level checkpointing commands, a client (e.g., UIs 55, applications 56, etc.) may specify what files to checkpoint, restore, and/or uncheckpoint. For example, the FCM 51 may use file-system hooks to map files to LBA-ranges along with LBAs containing associated file-metadata, based on the received file-level checkpointing command. The FCM 51 may then issue appropriate LBA-level requests to the SSD 58 to perform the file-level checkpointing commands.

For example, an application may checkpoint a file when the application closes the file after creating/modifying the file. The application may verify the file's content on a subsequent file-open (e.g., with suitable/appropriate techniques including custom and/or sophisticated checks). Application behavior may also trigger checkpointing/verification. If the verification fails, the application may restore the previous checkpoint (e.g., malware may have corrupted the file since the last write), and proceed otherwise. The application may choose to release the old checkpoint after creating a new one upon file-close. The application may choose to checkpoint only critical data files, but not other files (e.g., such as temporary files, or files readily restorable from other sources such as re-installable libraries). An application may also use the functionality of the FCM 51 to perform incremental backups of a file by checkpointing various versions along the way, rather than having to backup each file completely at various times. Advantageously, such checkpoints may consume far less capacity than backups and may also be much harder to destroy or corrupt. In some embodiments, a user may directly specify which files to checkpoint/restore/uncheckpoint (e.g., via a graphical UI, command line control, etc.) and the FCM 51 may ensure that those files are handled accordingly.

The checkpoint tracker 52 may track which files are checkpointed together with their corresponding LBA ranges. The checkpoint tracker 52 may receive notification of file-operations from the file system 54 (e.g., file open, close, read, write, delete, etc.) and may update its tracking accordingly (e.g., updating the LBA range that is checkpointed by the SSD 58 when additional data is written to a checkpointed file).

The checkpointing policy engine 53 may provide configurable automated policies for checkpointing control. For example, if a client specifies checkpointing of file X, then X may be automatically checkpointed on every file-close by the checkpointing policy engine 53. A user configurable number of checkpoints of the file may be maintained for X. Even after a file is deleted, the checkpointing policy engine 53 may maintain the file's checkpoints for a specified user-configurable duration. The checkpointing policy engine 53 may also prevent denial-of-service attacks by limiting the number of writes checkpointed per file. If malware tries to write a checkpointed file over and over, the checkpointing policy engine 53 may ensure, for example, that only the last 1 GB of writes to that file are rollback-able, preserving checkpointing capacity for other files. The checkpointing policy engine 53 may also limit any application to a certain number of checkpointed writes.

Figure 6:
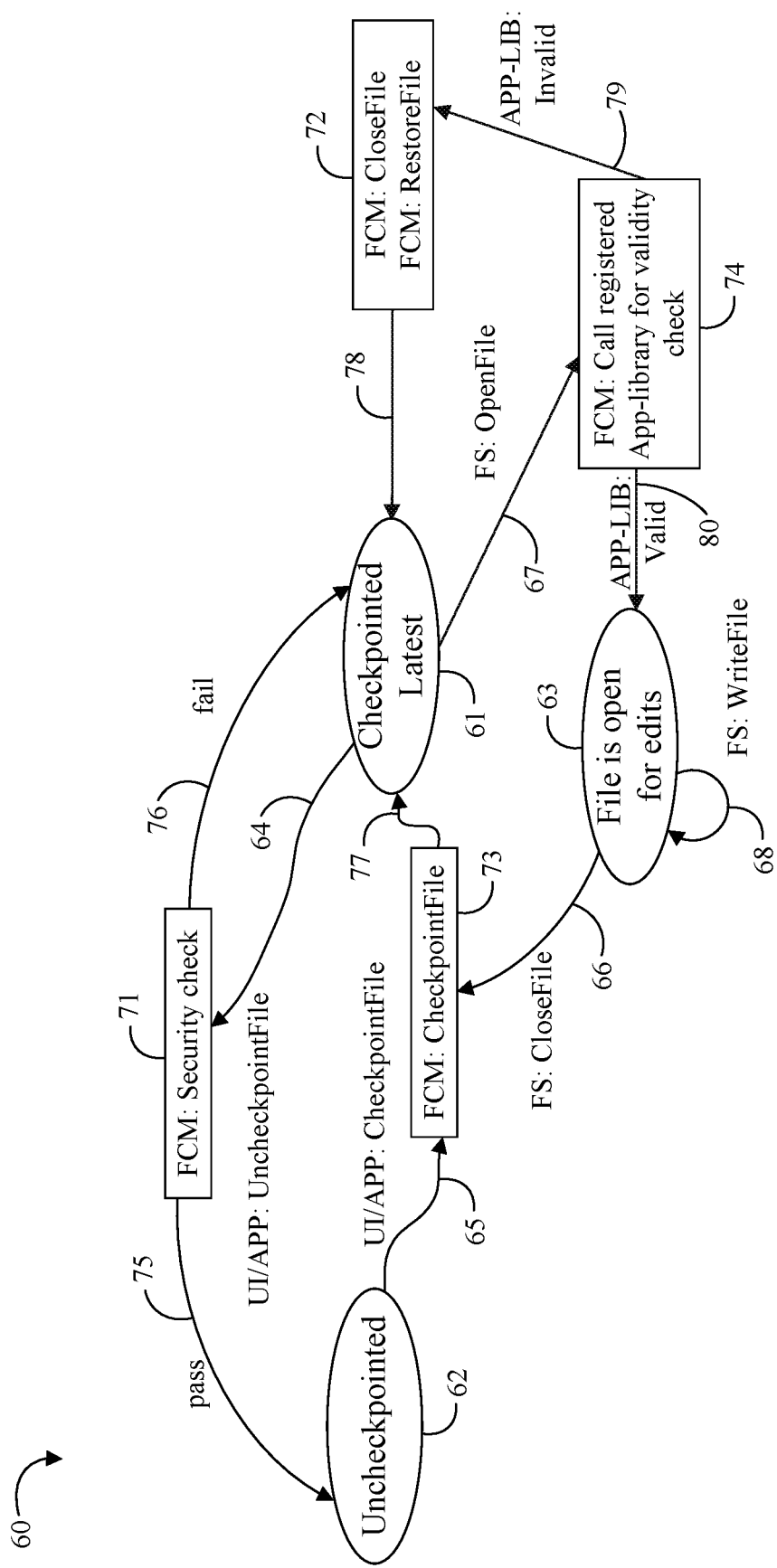
FIG. 6 is an illustrative state diagram of an example of application based checkpointing according to an embodiment.

Turning now to FIG. 6, an illustrative state diagram 60 shows an embodiment of FCM actions on events from a file system (FS) and an application (UI/APP). Actions on uncheckpointed files are not shown. For example, the FCM may be configured for the policy of validity-check on file-open, and checkpoint on file-close. Two states for at-rest/closed files may include a "checkpointed latest" state 61 and an "uncheckpointed" state 62. An open-file state may include a "file open for edits" state 63. UI/APP actions (e.g., potentially triggered by malware) may be shown as arrows 64 and 65. FS actions (e.g., potentially triggered by malware) may be shown as arrows 66, 67, and 68. The FCM actions may be shown in boxes 71 through 74 and arrows 75 through 80. Events may be initiated in any of several ways including the FCM using an application-specific library to check file format validity, an application actively notifying the FCM through a defined API (e.g., causing APP-LIB: Valid/Invalid transitions), and the FCM being configured with a policy (e.g., describing application behavior in case of valid and invalid file content) so the FCM may infer validity status by monitoring application behavior. Similarly, the APP-LIB: Valid/Invalid signals which may be provided in one of any of the above ways.

The FCM may advantageously provide technology that allows an application to register its critical file(s) and the application's file-validity checker. An application that registers itself may have its critical files automatically checked on open, and restored to a valid version if needed. New versions may be created upon closing of a valid file by the registered application or when a notification confirming validity is received. The FCM may also generate application-related requests by monitoring registered applications' behavior. Aspects of some embodiments may be implemented in the SSD device, a storage controller, system software (e.g., firmware, OS, drivers, etc.), and/or security solutions (e.g., anti-malware applications). Where a SSD device provides checkpointing commands, embodiments of an electronic processing system may advantageously provide application/user configurable policies for automatic checkpointing/restore of critical files. Some embodiments may provide APIs or other software together with a SSD device that supports checkpointing commands, to provide a platform-connected security solution.

ADDITIONAL NOTES AND EXAMPLES

Example 1 may include an electronic processing system, comprising a processor, persistent storage media communicatively coupled to the processor, and logic communicatively coupled to the processor to receive an application-related checkpoint request corresponding to a file of a file system stored on the persistent storage media, and determine one or more checkpoint operations internal to the persistent storage media to perform the application-related checkpoint request.

Example 2 may include the system of Example 1, wherein the logic is further to receive the checkpoint request from a user interface application.

Example 3 may include the system of Example 1, wherein the logic is further to apply one or more policies to the checkpoint request.

Example 4 may include the system of Example 3, wherein the logic is further to apply a policy to inhibit a denial-of-service attack from the checkpoint request.

Example 5 may include the system of Example 4, wherein the logic is further to apply policies to automatically detect when to checkpoint, release a checkpoint, and restore on a per-file basis.

Example 6 may include the system of any of Examples 1 to 5, wherein the persistent storage media comprises a solid state drive.

Example 7 may include a semiconductor apparatus, comprising one or more substrates, and logic coupled to the one or more substrates, wherein the logic is at least partly implemented in one or more of configurable logic and fixed-functionality hardware logic, the logic coupled to the one or more substrates to receive an application-related checkpoint request corresponding to a file of a file system stored on a persistent storage media, and determine one or more checkpoint operations internal to the persistent storage media to perform the application-related checkpoint request.

Example 8 may include the apparatus of Example 7, wherein the logic is further to receive the checkpoint request from a user interface application.

Example 9 may include the apparatus of Example 7, wherein the logic is further to apply one or more policies to the checkpoint request.

Example 10 may include the apparatus of Example 9, wherein the logic is further to apply a policy to inhibit a denial-of-service attack from the checkpoint request.

Example 11 may include the apparatus of Example 10, wherein the logic is further to apply policies to automatically detect when to checkpoint, release a checkpoint, and restore on a per-file basis.

Example 12 may include the apparatus of any of Examples 7 to 11, wherein the persistent storage media comprises a solid state drive.

Example 13 may include a method of checkpointing, comprising receiving an application-related checkpoint request corresponding to a file of a file system stored on a persistent storage media, and determining one or more checkpoint operations internal to the persistent storage media to perform the application-related checkpoint request.

Example 14 may include the method of Example 13, further comprising receiving the checkpoint request from a user interface application.

Example 15 may include the method of Example 13, further comprising applying one or more policies to the checkpoint request.

Example 16 may include the method of Example 15, further comprising applying a policy to inhibit a denial-of-service attack from the checkpoint request.

Example 17 may include the method of Example 16, further comprising applying policies to automatically detect when to checkpoint, release a checkpoint, and restore on a per-file basis.

Example 18 may include the method of any of Examples 13 to 17, wherein the persistent storage media comprises a solid state drive.

Example 19 may include at least one computer readable medium, comprising a set of instructions, which when executed by a computing device, cause the computing device to receive an application-related checkpoint request corresponding to a file of a file system stored on a persistent storage media, and determine one or more checkpoint operations internal to the persistent storage media to perform the application-related checkpoint request.

Example 20 may include the at least one computer readable medium of Example 19, comprising a further set of instructions, which when executed by the computing device, cause the computing device to receive the checkpoint request from a user interface application.

Example 21 may include the at least one computer readable medium of Example 19, comprising a further set of instructions, which when executed by the computing device, cause the computing device to apply one or more policies to the checkpoint request.

Example 22 may include the at least one computer readable medium of Example 21, comprising a further set of instructions, which when executed by the computing device, cause the computing device to apply a policy to inhibit a denial-of-service attack from the checkpoint request.

Example 23 may include the at least one computer readable medium of Example 22, comprising a further set of instructions, which when executed by the computing device, cause the computing device to apply policies to automatically detect when to checkpoint, release a checkpoint, and restore on a per-file basis.

Example 24 may include the at least one computer readable medium of any of Examples 19 to 23, wherein the persistent storage media comprises a solid state drive.

Example 25 may include a file checkpoint manager apparatus, comprising means for receiving an application-related checkpoint request corresponding to a file of a file system stored on a persistent storage media, and means for determining one or more checkpoint operations internal to the persistent storage media to perform the application-related checkpoint request.

Example 26 may include the apparatus of Example 25, further comprising means for receiving the checkpoint request from a user interface application.

Example 27 may include the apparatus of Example 25, further comprising means for applying one or more policies to the checkpoint request.

Example 28 may include the apparatus of Example 27, further comprising means for applying a policy to inhibit a denial-of-service attack from the checkpoint request.

Example 29 may include the apparatus of Example 28, further comprising means for applying policies to automatically detect when to checkpoint, release a checkpoint, and restore on a per-file basis.

Example 30 may include the apparatus of any of Examples 25 to 29, wherein the persistent storage media comprises a solid state drive.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An electronic processing system, comprising:
   a processor;
   persistent storage media communicatively coupled to the processor; and
   logic communicatively coupled to the processor to:
     receive an application-related checkpoint request corresponding to a file of a file system stored on the persistent storage media,
     determine one or more checkpoint operations internal to the persistent storage media to perform the application-related checkpoint request, and
     apply one or more policies to the checkpoint request, wherein at least one of the one or more policies is to inhibit a denial-of-service attack from the checkpoint request by limiting the number of such checkpoint requests from an associated application.

2. The system of claim 1, wherein the logic is further to: receive the checkpoint request from a user interface application.

3. The system of claim 1, wherein the logic is further to: apply policies to automatically detect when to checkpoint, release a checkpoint, and restore on a per-file basis.

4. The system of claim 1, wherein the persistent storage media comprises a solid state drive.

5. A semiconductor apparatus, comprising:
one or more substrates; and
logic coupled to the one or more substrates, wherein the logic is at least partly implemented in one or more of configurable logic and fixed-functionality hardware logic, the logic coupled to the one or more substrates to:
receive an application-related checkpoint request corresponding to a file of a file system stored on a persistent storage media,
determine one or more checkpoint operations internal to the persistent storage media to perform the application-related checkpoint request, and
apply one or more policies to the checkpoint request, wherein at least one of the one or more policies is to inhibit a denial-of-service attack from the checkpoint request by limiting the number of such checkpoint requests from an associated application.

6. The apparatus of claim 5, wherein the logic is further to:
receive the checkpoint request from a user interface application.

7. The apparatus of claim 5, wherein the logic is further to:
apply policies to automatically detect when to checkpoint, release a checkpoint, and restore on a per-file basis.

8. The apparatus of claim 5, wherein the persistent storage media comprises a solid state drive.

9. A method of checkpointing, comprising:
receiving an application-related checkpoint request corresponding to a file of a file system stored on a persistent storage media;
determining one or more checkpoint operations internal to the persistent storage media to perform the application-related checkpoint request; and
applying one or more policies to the checkpoint request, wherein at least one of the one or more policies inhibits a denial-of-service attack from the checkpoint request by limiting the number of such checkpoint requests from an associated application.

10. The method of claim 9, further comprising:
receiving the checkpoint request from a user interface application.

11. The method of claim 9, further comprising:
applying policies to automatically detect when to checkpoint, release a checkpoint, and restore on a per-file basis.

12. The method of claim 9, wherein the persistent storage media comprises a solid state drive.

13. At least one non-transitory computer readable medium, comprising a set of instructions, which when executed by a computing device, cause the computing device to:
receive an application-related checkpoint request corresponding to a file of a file system stored on a persistent storage media;
determine one or more checkpoint operations internal to the persistent storage media to perform the application-related checkpoint request; and
apply one or more policies to the checkpoint request, wherein at least one of the one or more policies is to inhibit a denial-of-service attack from the checkpoint request by limiting the number of such checkpoint requests from an associated application.

14. The at least one non-transitory computer readable medium of claim 13, comprising a further set of instructions, which when executed by the computing device, cause the computing device to:
receive the checkpoint request from a user interface application.

15. The at least one non-transitory computer readable medium of claim 13, comprising a further set of instructions, which when executed by the computing device, cause the computing device to:
apply policies to automatically detect when to checkpoint, release a checkpoint, and restore on a per-file basis.

16. The at least one non-transitory computer readable medium of claim 13, wherein the persistent storage media comprises a solid state drive.

* * * * *